E. H. NEU.
TIRE TESTER.
APPLICATION FILED FEB. 5, 1912.
1,027,497.
Patented May 28, 1912.
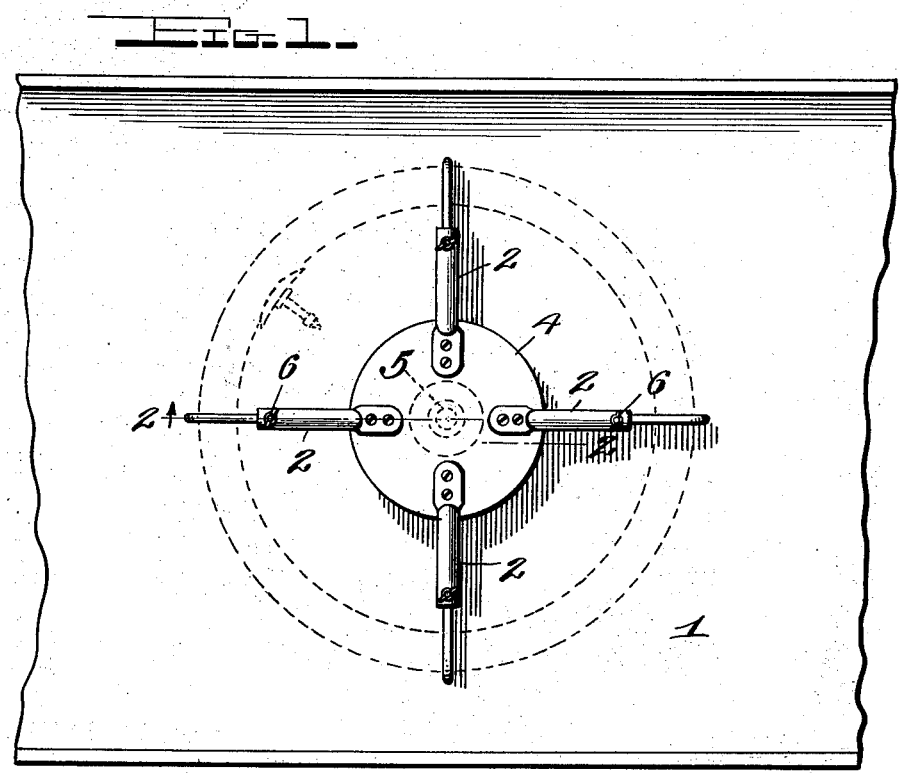
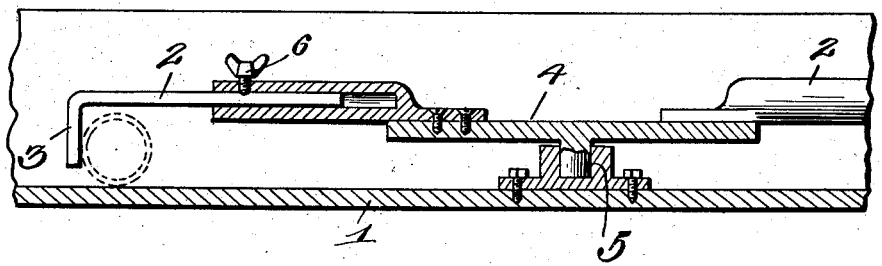
Witnesses
Chas. L. Grieshauer.
A. B. Norton.
Inventor
E. H. Neu,
By Watson E. Coleman.
Attorney

UNITED STATES PATENT OFFICE.

EDMUND H. NEU, OF PANA, ILLINOIS.

TIRE-TESTER.

1,027,497.   Specification of Letters Patent.   Patented May 28, 1912.

Application filed February 5, 1912. Serial No. 675,404.

*To all whom it may concern:*

Be it known that I, EDMUND H. NEU, a citizen of the United States, residing at Pana, in the county of Christian and State of Illinois, have invented certain new and useful Improvements in Tire-Testers, of which the following is a specification, reference being had to the accompanying drawings.

From actual and practical experience in connection with the manufacture of pneumatic tires for automobiles and similar vehicles, and particularly in connection with the inner tubes thereof, I have found that it has heretofore been the practice, in testing the inner tubes, to immerse the tubes in water contained in a tank, and to rapidly manipulate the inner tube so that one portion thereof after another shall be immersed, the tendency being to make the operation a very rapid one, and thereby failing to properly test the tubes.

With the knowledge of these conditions my present invention aims primarily to provide a simple and efficient construction of device whereby the tubes may be held submerged any desired time and therefore effectively tested, the device doing away with the necessity of holding the tire tube immersed by hand, whereby the operator may handle a number of tubes at the same time in the same tank, and thus do considerable work, while at the same time the testing operation is not superficially performed.

With these and other objects in view as will more fully appear as the description proceeds, the invention consists essentially in a tire testing tank provided with an improved arrangement of tube holding devices which may be easily engaged with the tube and hold the same submerged long enough to properly test the tube. And the invention also consists in certain constructions and arrangements and combinations of the parts that I shall hereinafter fully describe and claim.

For a full knowledge of the invention reference is to be had to the following description and accompanying drawing, in which:—

Figure 1 is a plan view of a portion of a testing tank provided with the improvements of my invention; and Fig. 2 is a fragmentary sectional view thereof.

Corresponding and like parts are referred to in the following description and designated in the accompanying drawing by like reference characters.

Referring to the drawing the numeral 1 designates a portion of a tank designed to contain water and of any desired construction, size and shape so far as its body portion is concerned, the tank being preferably of a size to contain several of my improved holders whereby one operator may tend several holders and thus make the testing operation a practically continuous one, one tube being left in the water long enough to be properly tested while the operator is removing another tube, or adding another tube.

My improved holding device includes a plurality of arms 2 which in the present instance are four in number, although it is to be understood that the invention is not limited to this or any number of arms. In the present embodiment of the device the arms 2 are formed by rods, as shown, and their outer ends are turned downwardly as at 3 so as to extend over and around a tube and hold the same, while being tested, against accidental displacement. The inner ends of the arms 2 are secured to a head 4 which is mounted upon a pedestal so as to rotate thereon, the revoluble mounting of the arms enabling the tube to be turned around so that every portion thereof may be brought into the view or inspection of the operator and the tube be thereby properly tested. If desired, the arms 4 may be constructed in telescoping sections connected together in extensible relation to each other by set screws 6, so as to adapt the device for tubes of different diameters.

From the foregoing description in connection with the accompanying drawing, the operation of my improved tire testing device will be apparent. In the practical use of the device, the tubes are placed one after another in the tank 1 and held submerged therein by the arms 2, the holder being rotated so that the operator may inspect the entire tube and to see that there are no leaks. If desired, the arms 2 may be axially rotatable in the head 4, so that their extremities 3 may be turned up to allow the tube to be easily placed in position and then turned down so as to hold the tube secure against displacement, entirely submerged in the water in the tank 1.

Having thus fully described my invention, what I claim is:

1. A device of the character described, including a tank adapted to contain water, a revoluble head mounted in the tank, and axially movable radially disposed arms carried by said head and formed with angular extremities, for the purpose specified.

2. A device of the character described, including a tank adapted to contain water, a revoluble head mounted in the tank, and a plurality of longitudinally extensible and axially rotatable arms carried by said head and formed with outer angular ends, for the purpose specified.

In testimony whereof I hereunto affix my signature in the presence of two witnesses.

EDMUND H. NEU.

Witnesses:
CLAUDE BUTTS,
FRED J. WEBER.

Copies of this patent may be obtained for five cents each, by addressing the "Commissioner of Patents, Washington, D. C."